United States Patent [19]
Li et al.

[11] Patent Number: 5,821,522
[45] Date of Patent: Oct. 13, 1998

[54] OPTICAL SCANNER WITH HIGH SPEED ZOOM CAPABILITY

[75] Inventors: Yajun Li, Oakdale; Eugene Joseph, Port Jefferson Station, both of N.Y.

[73] Assignee: Symbol Technologies, Inc., Holtsville, N.Y.

[21] Appl. No.: 627,167

[22] Filed: Apr. 3, 1996

[51] Int. Cl.[6] .................................................... G06F 7/10
[52] U.S. Cl. .......................................... 235/472; 235/462
[58] Field of Search ..................................... 235/472, 462

[56] References Cited

U.S. PATENT DOCUMENTS

| | | |
|---|---|---|
| 4,251,798 | 2/1981 | Swartz et al. . |
| 4,369,361 | 1/1983 | Swartz et al. . |
| 4,387,297 | 6/1983 | Swartz et al. . |
| 4,409,470 | 10/1983 | Shepard et al. . |
| 4,760,248 | 7/1988 | Swartz et al. . |
| 4,896,026 | 1/1990 | Krichever et al. . |
| 5,170,277 | 12/1992 | Bard et al. ............... 235/472 |
| 5,243,655 | 9/1993 | Wang . |
| 5,304,786 | 4/1994 | Pavlidis et al. . |
| 5,331,176 | 7/1994 | Sant'Anselmo et al. ............... 235/472 |
| 5,378,883 | 1/1995 | Batterman et al. ...................... 235/472 |
| 5,386,107 | 1/1995 | Dvorkis et al. .......................... 235/472 |
| 5,576,529 | 11/1996 | Koenck et al. .......................... 235/472 |

*Primary Examiner*—Harold Pitts

[57] ABSTRACT

A bar code scanner comprises a lens structure for effecting magnification of a bar code image along an optical axis of the scanner. A support member supports the lens structure, the support member being movable into first and second bi-stable positions along the optical axis and disposing the lens structure in respective first and second locations spaced mutually along the optical axis, and a displacing unit for displacing the support member exclusively into residence in one or the other of the first and second positions.

24 Claims, 2 Drawing Sheets

OPTICAL SCANNER WITH HIGH SPEED ZOOM CAPABILITY

FIELD OF THE INVENTION

The present invention relates generally to an optical scanner and more particularly pertains to a bar code scanner having capability for selectively introducing enhanced image magnification in the course of scanning bar codes.

DESCRIPTION OF THE RELATED ART

Various optical readers and optical scanning systems have been developed heretofore for reading bar code symbols appearing on a label or on the surface of an article. The bar code symbol itself is a coded pattern of indicia comprised of a series of bars of various widths spaced apart from one another to bound spaces of various widths, the bars and spaces having different light reflecting characteristics. The readers and scanning systems electro-optically transform the graphic indicia into electrical signals, which are thereafter decoded into alphanumeric characters that are intended to be descriptive of the article or some characteristic thereof. Such characters are typically represented in digital form and utilized as an input to a data processing system for applications in point-of-sale processing. Inventory control, and the like scanning systems of this general type have been disclosed, for example, in U.S. Pat. Nos. 4,251,798; 4,369,361; 4,387,297, 4,409,470; 4,760,248; and 4,896,026, all of which have been assigned to the same assignee as the instant application.

As disclosed in some of the above patents, one embodiment of such a scanning system resides, inter alia, in a hand-held, portable scanning head supported by a user, which is configured to allow the user to aim the head, and more particularly, a light beam, at a target and a symbol to be read.

The light source in a laser scanner is typically a gas laser or semiconductor laser. The use of a semiconductor devices such as a laser diode as the light source in scanning systems is especially desirable because of their small size, low cost and low power requirements. The beam is optically modified, typically by optical elements, such as lenses, mirrors, apertures, etc., to form a beam spot of a certain size at the target distance. It is preferred that the beam spot size at the target distance be approximately the same as the minimum width between regions of different light reflectivity, i.e., the bars or spaces of the symbol.

Bar code symbols are formed from bars or elements that are typically rectangular in shape with a variety of possible widths. The specific arrangement of elements defines the character represented according to a set of rules and definitions specified by the code or "symbology" used. The relative size of the bars and spaces is determined by the type of coding used, as is the actual size of the bars and spaces. The narrowest bar/space of a bar code symbol determines the number of characters per millimeter or per inch and is referred to as the density of the symbol. To encode a desired sequence of characters, element arrangements are concatenated together to form the complete bar code symbol, with each character of the message being represented by its own corresponding group of elements. In some symbologies a unique "start" and "stop" character is used to indicate where the bar code begins and ends, thus defining the pattern to be decoded/identified. A number of different bar code symbologies exist. These symbologies include UPC/EAN, Code 39, Code 1281, Codabar, and Interleaved 2 of 5, among others.

A further known symbology is known as two-dimensional (2D) symbology and is discussed in detail in commonly-assigned U.S. Pat. No. 5,243,655 and U.S. Pat. No. 5,304,786, which are incorporated herein by this reference thereto. Briefly, that symbology involves a variable number of component symbols or "codewords" per row of a nonvolatile electro-optical read-only memory imprinted on a substrate. Codewords in alternating rows are selected from mutually exclusive subsets of a mark pattern, the subsets being defined in terms of particular values of a discriminator function which is illustrated in the referenced patents as being a function of the widths of bars and spaces in a given codeword.

In the scanning systems known in the art, the light beam is directed by a lens or similar optical components along a light path toward a target that includes a bar code symbol on the surface. The scanning systems function by repetitively scanning the light beam in a line or series of lines across the symbol. The scanning component may either sweep the beam spot across the symbol and trace a scan line across the past the symbol, or scan the field of view of the scanner, or do both.

Scanning systems also include a sensor or photodetector which functions to detect light reflected from the symbol. The photodetector is therefore-positioned in the scanner or in an optical path in which it has a field of view which extends across and slightly past the symbol. A portion of the reflected light which is reflected off the symbol is detected and converted into an electrical signal. Electronic circuitry or software thereafter decodes the electrical signal into a digital representation of the data represented by the symbol that has been scanned. For example, the analog electrical signal from the photodetector may typically be converted into a pulse width modulated digital signal, with the widths corresponding to the physical widths of the bars and spaces. Such a signal is then decoded according to the specific symbology into a binary representation of the data encoded in the symbol, and to the alphanumeric character so represented.

The decoding process in known scanning systems usually works in the following way. The decoder receives the pulse width modulated digital signal from the scanner, and an algorithm implemented in software attempts to decode the scan. If the start and stop characters and the characters between them in the scan were decoded successfully and completely, the decoding process terminates and an indicator of a successful read (such as a green light and/or an audible beep) is provided to the user. Otherwise, the decoder receives the next scan, performs another decode attempt on that scan, and so on, until a completely decoded scan is achieved or no more scans are available.

Decoding in 2D symbology is discussed particularly and shown in various flowcharts set forth in the 2D symbology patents incorporated by reference and above identified.

Another type of bar code reader is one which incorporates a detector based upon charge coupled device (CCD) technology. CCDs consist of an array of many detectors, commonly referred to as "pixels". The entire symbol is flooded with light from the reader or ambient light, and each pixel is sequentially read out to determine the presence of a bar or a space. Such readers are light-weight and easy to use, but require substantially direct contact or placement of the reader on the symbol to enable the symbol to be properly read. Such physical contact of the reader with the symbol is a preferred mode of operation for many applications, or as a matter of personal preference by the user.

A basic figure of merit in scanning CCD arrays is a so-called "pixels per module" detection. If detection capability falls below such-figure of merit, scanning cannot proceed in that requisite sensitivity is not present.

SUMMARY OF THE INVENTION

A primary object of the present invention is to provide a bar code scanner including enhanced magnification capacity selectively and quickly operable.

In attaining this and other objects, the invention provides a bar code scanner comprising a lens structure for effecting magnification of a bar code image along an optical axis of the scanner, support means for supporting the lens structure, the support means being movable into first and second positions along the optical axis and disposing the lens structure in respective first and second locations spaced mutually along the optical axis, and displacing means for displacing the support means exclusively into residence in one or the other of the first and second positions.

In a particularly preferred embodiment, the bar code scanner of the invention comprises a first lens structure for effecting magnification of a bar code image along an optical axis of the scanner, first support means for supporting the first lens structure, the first support means being movable into first and second positions along the optical axis and disposing the first lens structure in respective first and second locations spaced mutually along the optical axis, a second lens structure disposed along the optical axis of the scanner, second support means for fixedly supporting the second lens structure in a third location along the scanner optical axis and displacing means for displacing the first support means exclusively into residence in one or the other of the first and second positions.

BRIEF DESCRIPTION OF THE DRAWINGS

The foregoing objects and advantages of the present invention for an optical scanner with selectively enhanced magnification capacity may be more readily understood by one skilled in the art with reference being had to the following detailed description of preferred embodiments thereof, taken in conjunction with the accompanying drawings wherein like elements are designated by identical reference numerals throughout the several views, and in which.

DETAILED DESCRIPTION OF PREFERRED EMBODIMENTS AND PRACTICES

Figure 1:
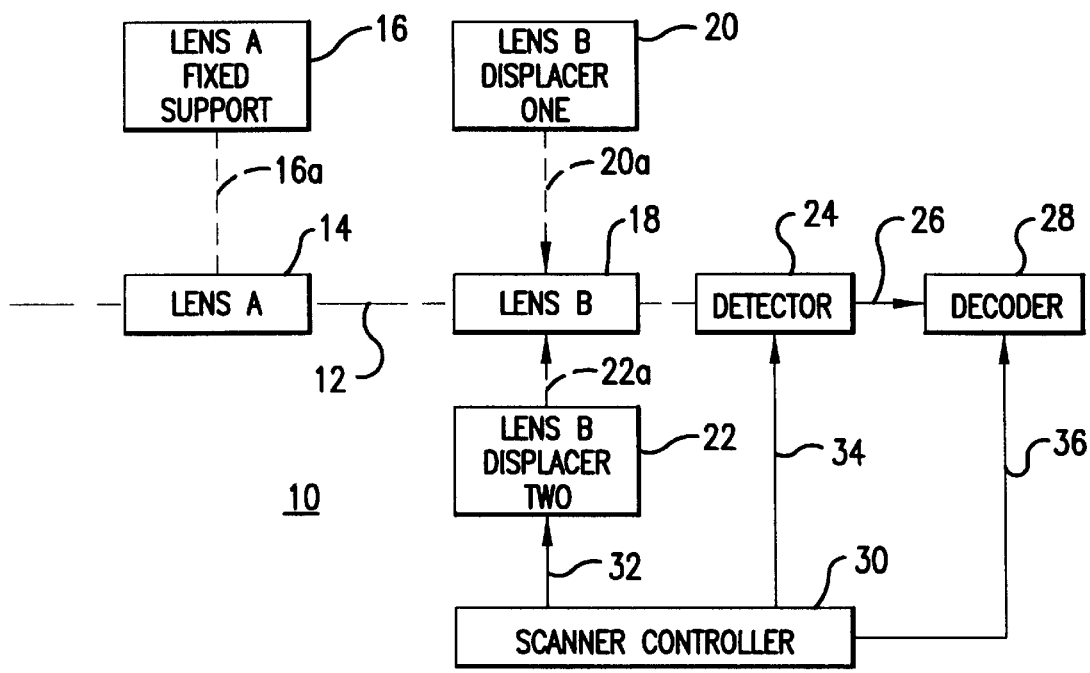
FIG. 1 is a functional block diagram of scanning apparatus in accordance with the invention.

Referring to FIG. 1, scanning apparatus 10 of the invention includes an optical axis 12 and has LENS A (14) centered about axis 12 and fixedly supported longitudinally by LENS A FIXED SUPPORT (16) through mechanical engagement indicated by line 16a.

LENS B (18) is likewise centered about axis 12 and has LENS B DISPLACER ONE (20) providing first sense displacement to lens 18 over mechanical engagement indicated by line 20a. LENS B DISPLACER TWO (22) provides second sense displacement to lens 18 over mechanical engagement indicated by line 22a, the second sense displacement being opposite in direction along axis 12 to the first sense displacement.

DETECTOR 24 is successive to lens 18 along axis 12 and may be comprised of any suitable optical-to-electrical transducer, as above discussed, e.g., a CCD array, electrical output signals of which are conveyed by lines 26 to decoder 28, which may be any of the above-discussed known decoders for decoding of one-dimensional or two-dimensional symbology.

Lens 18 is zoom lens imparting a first level of magnification to images output from lens 14 when displacer 22 is inactive and imparting a second level of magnification to images output from lens 14 when displacer 22 is active, the second magnification level being enhanced relative to the first magnification level. Displacer 22 becomes active when SCANNER CONTROLLER 30 receives user input calling for enhanced magnification, based on a control signal provided by controller 30 to displacer 22 over line 32. Controller 30 further provides control signals over lines 34 and 36, respectively to detector 24 and decoder 28. In the case of a CCD array for detector 24, the line 34 control signal calls for reading of the pixels of the array and the line 36 control signal provides timing control of pixel output signals to be read into decoder 28.

Figure 2:
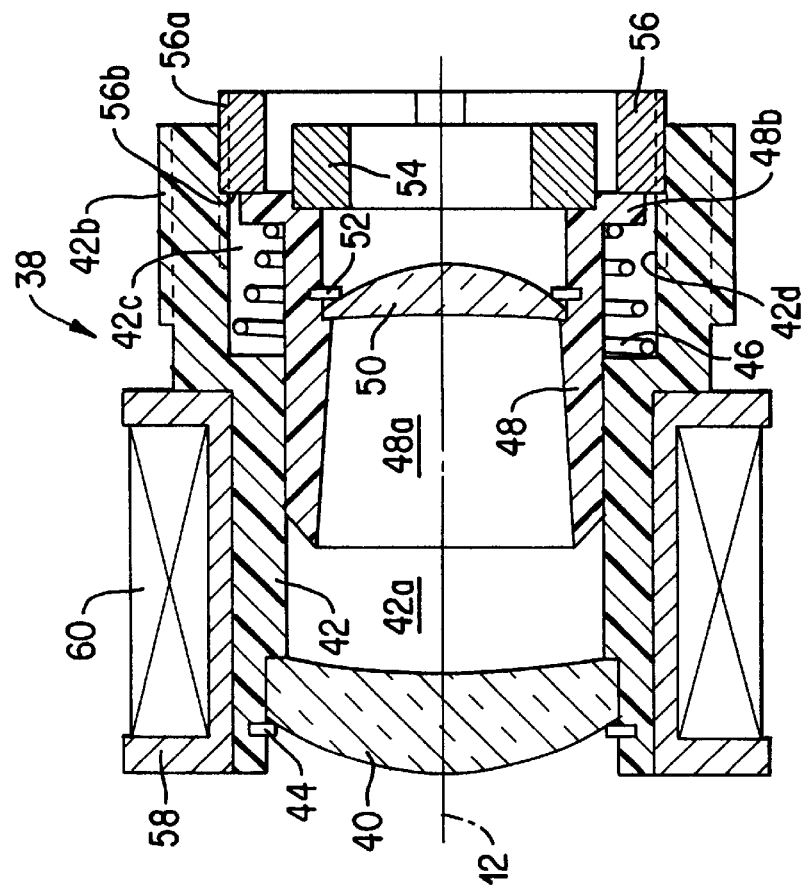
FIG. 2 is a central sectional side elevation of scanning apparatus in accordance with the invention.
Figure 3:
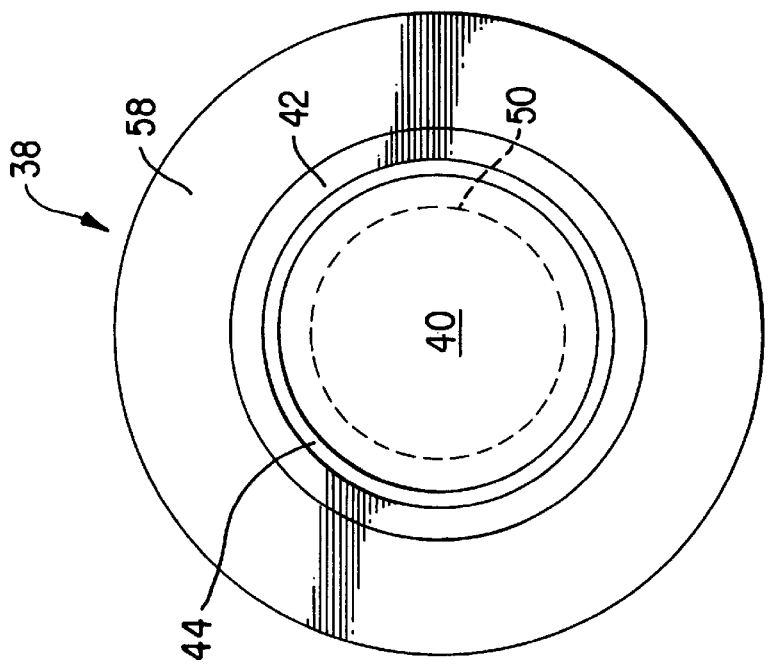
FIG. 3 is a front elevation of the apparatus of FIG. 2.

Turning to FIGS. 2 and 3, apparatus 38 of the invention provides an embodiment of components of FIG. 1 except for system components including detector 24, decoder 28 and controller 30. Focusing lens 40, counterpart to lens 14 of FIG. 1, is supported by outer housing 42, being secured in housing interior hollow 42a by snap ring 44. The housing is exteriorly threaded at 42b for securement to parent apparatus (not shown) containing detector 24, decoder 28 and controller 30, and defines rightwardly open nest 42c.

Compression spring 46, counterpart to displacer 20 of FIG. 1, is seated in nest 42c, axially between outer housing 42 and inner housing 48, having interior hollow 48a. Spring 46 bears rightwardly on flange 48b.

Lens 50, counterpart to lens 18 of FIG. 1, is secured to inner housing 48 by snap ring 52. Permanent magnet 54 is secured to the rightward end of inner housing 48. Adjustment ring 56 is exteriorly threaded at 56a and is movable along axis 12 by engagement of threading 56a with interior threading 42d of outer housing 42 upon rotation of ring 56.

Bobbin 58 is secured to the exterior of housing 42 and supports driving coil 60 in circumscribing relation to the housing and also to housing 48. Coil 60 and permanent magnet 54 together constitute an embodiment of lens displacer 22 of FIG. 1. In such embodiment, the line 32 (FIG. 1) control signal is a direct current of magnitude sufficient to overcome the force applied by spring 46 to flange 48b of inner housing 48 and to so attract magnet 54 leftwardly in FIG. 2 to collapse spring 46 in nest 42c and displace inner housing 48 leftwardly. The compressed spring thus defines a leftward stop position for movement of inner housing 48 and a leftwardmost location for lens 50. The leftward surface of 56b of ring 56 defines a rightward stop position for movement of inner housing 48 and a rightwardmost location for lens 50. The latter position is adjustable by rotating ring 56 relative to outer housing 42.

As will be appreciated, lens 50 may be termed a "bi-zoom" lens, i.e., during operation of scanner apparatus 38, lens 50 will be located exclusively at one or the other of the leftwardmost and rightwardmost locations. This is in contrast to customary zoom lens arrangements, wherein the zoom lens takes on any of the infinity of operational positions between a telephoto end and a wide angle end of the zoom lens movement locus.

As is seen in FIG. 3, bobbin 58, which may be constituted of low carbon steel, is cylindrical, as is its supported coil 60. Housings 42 and 48 will be seen likewise to be cylindrical in configuration and may be comprised of plastic material.

Discussion above has called for a user's input to controller 30 for generation of the line 32 control signal for activating lens displacer 22. On the other hand, the invention contemplates that controller 30 may include means for sensing the aforementioned figure of merit in scanning CCD arrays (the "pixels per module" detection capability), and generating the control signal on line 32 when such figure of merit falls below a preselected level, whereupon "quick zoom" is effected by activation of displacer 22.

By way of summary and introduction to the ensuing claims, the invention will be seen to provide, in a first aspect, a bar code scanner comprising a lens structure for effecting magnification of a bar code image along an optical axis of the scanner, support means for supporting the lens structure, the support means being movable into first and second positions along the optical axis and disposing the lens structure in respective first and second locations spaced mutually along the optical axis, and displacing means for displacing the support means exclusively into residence in one or the other of the first and second positions.

The displacing means may include first displacement means for constantly imparting a first displacement force to the support means to urge the support means into residence in the first position and second displacement means selectively operable for imparting a second displacement force to the support member to cause the support means to move into residence in the second position.

The first displacement means may include a resilient member imparting the first displacement force to the support means. The second displacement means may comprise an electromagnet and controller means may be provided for selectively energizing the electromagnet. The electromagnet imposes the second displacement force on the support means in measure exceeding the first displacement force.

The electromagnet is preferably constituted by a coil in circumscribing relation to the support means and a permanent magnet affixed to the support means.

Stop means may be disposed in an interference path with the support means and define the first and second positions thereof. The stop means may be variably positionable along the optical axis, whereby the first position is variably definable.

The bar code scanner includes detector means for generating electrical output signals indicative of radiation incident thereon as issued from the lens structure and a bar code decoder receiving the electrical output signals of the detector means.

In another aspect, the invention includes first and lens structures for respective zooming and focusing purposes and first and second support means for the first and second lenses.

In a particularly preferred and detailed embodiment, the invention provides a bar code scanner comprising an outer housing defining an interior hollow of cylindrical configuration and an interior surface extending radially outwardly of the interior hollow, i.e., the surface leftwardly bounding nest 42c, a focusing lens supported by the outer housing in facing relation to the interiorly hollow thereof, an inner housing of cylindrical configuration and slidably disposed in the interior hollow, the inner housing defining an interior surface, i.e., the leftward surface of flange 48b, extending radially outwardly of the interior hollow, and biasing means disposed between the interior radially extending surfaces of the outer housing and the inner housing for urging the outer and inner housings into mutually spaced relation axially of the interior hollow.

A coil is supported by the outer housing in circumscribing relation thereto. A permanent magnet is secured to the inner housing. A stop member is supported by the outer housing in interference path with the inner housing axially of the interior hollow. The outer housing supports the stop member for variable positioning of the stop member axially of the interior hollow. The biasing means comprises a compression spring in circumscribing relation to the inner housing.

While preferred system and apparatus embodiments of the present invention for an optical scanner are described in detail herein, it should be apparent that the disclosure and teachings of the present invention will suggest many alternative designs to those skilled in the art.

What is claimed is:

1. A bi-stable high speed zoom collection system for a bar code scanner comprising:
   (a) a lens structure for effecting magnification of a bar code image along a collection optical axis of said scanner;
   (b) a bi-stable support means for supporting said lens structure, said support means being movable into first and second positions along said collection optical axis and disposing said lens structure in respective first and second locations spaced mutually along said collection optical axis; and
   (c) high speed displacing means for displacement of said support means exclusively into residence in one or the other of said first and second positions.

2. The high speed zoom collection system claimed in claim 1, wherein said high speed displacing means includes first displacement means for constantly imparting a first displacement force to said bi-stable support means to urge said bi-stable support means into residence in said first position.

3. The high speed zoom collection system claimed in claim 2, wherein said high speed displacing means includes second displacement means selectively operable for imparting a second displacement force to said bi-stable support means to cause said support means to move into residence in said second position.

4. The high speed zoom collection system claimed in claim 2, wherein said first displacement means includes a resilient member imparting said first displacement force to said bi-stable support means.

5. The high speed zoom collection system claimed in claim 3, wherein said second displacement means comprises an electromagnet and means for selectively energizing said electromagnet.

6. The high speed zoom collection system claimed in claim 4, wherein said second displacement means comprises an electromagnet imposing said second displacement force on said bi-stable support means in measure exceeding said first displacement force.

7. The high speed zoom collection system claimed in claim 6, wherein said electromagnet is constituted by a coil in circumscribing relation to said bi-stable support means and a permanent magnet affixed to said bi-stable support means.

8. The high speed zoom collection system claimed in claim 1, further including stop means disposed in an interference path with said bi-stable support means and defining said first position thereof.

9. The high speed zoom collection system claimed in claim 8, wherein said stop means is variably positionable along said optical axis, whereby said first position is variably definable.

10. The high speed zoom collection system claimed in claim 1, further including detector means for generating electrical output signals indicative of radiation incident thereon as issued from said lens structure.

11. The high speed zoom collection system claimed in claim 1, further including a bar code decoder receiving said electrical output signals of said detector means.

12. The high speed zoom collection system claimed in claim 3, further including controller means for selectively operating said second displacement means.

13. A high speed zoom collection system for a bar code scanner comprising:

(a) a first lens structure for effecting magnification of a bar code image along collection optical axis of said scanner;

(b) first bi-stable support means for supporting said first lens structure, said first bi-stable support means being movable into first and second positions along said optical axis and disposing said first lens structure in respective first and second locations spaced mutually along said optical axis;

(c) a second lens structure disposed along said collection optical axis of said scanner;

(d) second support means for fixedly supporting said second lens structure in a third location along said collection optical axis; and (e) high speed displacing means for displacing said first bi-stable support means exclusively into residence in one or the other of said first and second positions.

14. The high speed zoom collection system claimed in claim 13, wherein said high speed displacing means includes first displacement means for constantly imparting a first displacement force to said first bi-stable support means to urge said first support means into residence in said first position.

15. The high speed zoom collection system claimed in claim 14, wherein said high speed displacing means includes second displacement means selectively operable for imparting a second displacement force to said first bi-stable support means to cause said first bi-stable support means to move into residence in said second position.

16. The high speed zoom collection system claimed in claim 14, wherein said first displacement means includes a resilient member imparting said first displacement force to said first bi-stable support means.

17. The high speed zoom collection system claimed in claim 15, wherein said second displacement means comprises an electromagnet and means for selectively energizing said electromagnet.

18. The high speed zoom collection system claimed in claim 16, wherein said second displacement means comprises an electromagnet imposing said second displacement force on said first bi-stable support means in measure exceeding said first displacement force.

19. The high speed zoom collection system claimed in claim 18, wherein said electromagnet is constituted by a coil supported by and in circumscribing relation to said second support means and a permanent magnet affixed to said first bi-stable support means.

20. The high speed zoom collection system claimed in claim 13, further including stop means disposed in an interference path with said first bi-stable support means and defining said first position thereof.

21. The high speed zoom collection system claimed in claim 20, wherein said stop means is variably positionable along said optical axis, whereby said first position is variably definable.

22. The high speed zoom collection system claimed in claim 13, further including detector means for generating electrical output signals indicative of radiation incident thereon as issued from said first lens structure.

23. The high speed zoom collection system claimed in claim 22, further including a bar code decoder receiving said electrical output signals of said detector means.

24. The high speed zoom collection system claimed in claim 15, further including controller means for selectively operating said second displacement means.

* * * * *